United States Patent
Nomura (10) Patent No.: US 11,681,384 B2
(45) Date of Patent: Jun. 20, 2023

(54) PROCESSOR FOR CONTROLLING INPUT BY ELECTRONIC PEN AND METHOD PERFORMED BY COMPUTER USED IN CONJUNCTION WITH ELECTRONIC PEN

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/735,975

(22) Filed: May 3, 2022

(65) Prior Publication Data

US 2022/0382392 A1    Dec. 1, 2022

(30) Foreign Application Priority Data

May 31, 2021 (JP) .............................. JP2021-090967

(51) Int. Cl.
  *G06F 3/0354* (2013.01)
  *G06F 3/038* (2013.01)
  *G06F 3/044* (2006.01)
  *G06F 3/041* (2006.01)

(52) U.S. Cl.
  CPC ........ *G06F 3/03546* (2013.01); *G06F 3/0383* (2013.01); *G06F 3/03545* (2013.01); *G06F 3/0441* (2019.05); *G06F 3/0442* (2019.05); *G06F 3/04162* (2019.05)

(58) Field of Classification Search
  CPC . G06F 3/03545; G06F 3/0442; G06F 3/04162
  USPC ......................................................... 345/179
  See application file for complete search history.

(56) References Cited

U.S. PATENT DOCUMENTS

| 2014/0160045 A1* | 6/2014 | Park ...................... G06F 3/0482 345/173 |
| 2021/0055807 A1 | 2/2021 | Ogata et al. |
| 2021/0397342 A1* | 12/2021 | Luo ........................ G06F 3/0442 |

FOREIGN PATENT DOCUMENTS

JP        2021-033542 A    3/2021

* cited by examiner

*Primary Examiner* — Koosha Sharifi-Tafreshi
(74) *Attorney, Agent, or Firm* — Seed IP Law Group LLP (57) ABSTRACT

Provided is a processing device for controlling input by an electronic pen. The electronic pen includes a side switch disposed on a side surface of the electronic pen and a device that obtains contact information indicating whether or not a pen tip of the electronic pen is in contact with a panel. The processing device includes a processor and a memory storing instructions which, when executed by the processor, cause the processing device to: obtain switch information indicating a depression state of the side switch, determine whether or not the pen tip is in contact with the panel based on the contact information, output the switch information when the pen tip is not determined to be in contact with the panel, and disable a value of the switch information when the pen tip is determined to be in contact with the panel.

10 Claims, 6 Drawing Sheets

(title page, omitting per document extraction standard)

PROCESSOR FOR CONTROLLING INPUT BY ELECTRONIC PEN AND METHOD PERFORMED BY COMPUTER USED IN CONJUNCTION WITH ELECTRONIC PEN

BACKGROUND

Technical Field

The present disclosure relates to a processing device for controlling input by an electronic pen and a method performed by a computer used in conjunction with the electronic pen.

Description of the Related Art

Electronic pens having switches such as side switches or tail switches are known. Japanese Patent Laid-Open No. 2021-033542 (hereinafter, referred to as Patent Document 1) discloses an example of an electronic pen of this kind. Patent Document 1 describes use of a side switch for implementing a function similar to that of a left click or a right click of a mouse.

The side switch of the electronic pen is generally provided at a position that an index finger of a user holding the electronic pen touches. This is out of consideration for facilitating depression of the side switch in a state in which the electronic pen is held. However, the switch is not provided on traditional stationery such as a ballpoint pen or a pencil. Thus, when a user not accustomed to the electronic pen uses the electronic pen, the index finger may unintentionally touch the side switch during writing. Then, a function of a left click, a right click, or the like is activated, with a result that a stroke line is unexpectedly selected during the writing, for example, and thus processing for drawing is interrupted. An improvement has therefore been desired.

BRIEF SUMMARY

It is accordingly an object of the present disclosure to provide a processing device and a method that can prevent processing for drawing from being interrupted against the intention of a user.

A processing device according to the present disclosure is for controlling input by an electronic pen. The electronic pen includes a side switch disposed on a side surface of the electronic pen and a device that obtains contact information indicating whether or not a pen tip of the electronic pen is in contact with a panel. The processing device includes a processor and a memory storing instructions which, when executed by the processor, cause the processing device to: obtain switch information indicating a depression state of the side switch, determine whether or not the pen tip is in contact with the panel based on the contact information, output the switch information when the pen tip is not determined to be in contact with the panel, and disable a value of the switch information when determining that the pen tip is in contact with the panel.

A method according to the present disclosure is performed by a computer used in conjunction with an electronic pen, the method including: operating, by the computer, a setting tool that sets a setting for disabling a value of switch information indicating a depression state of a side switch disposed on a side surface of the electronic pen when a pen tip of the electronic pen is in contact with a panel, and disabling, by the computer, the value of the switch information when a pen tip of the electronic pen is in contact with the panel and the setting for disabling the value of the switch information when the pen tip is in contact with the panel is made in the setting tool.

According to the present disclosure, during drawing during which the pen tip is in contact with the panel, a function corresponding to the side switch is not activated, and therefore processing for the drawing can be prevented from being interrupted against the intention of a user.

DETAILED DESCRIPTION

Preferred embodiments of the present disclosure will hereinafter be described in detail with reference to the accompanying drawings.

Figure 1A:
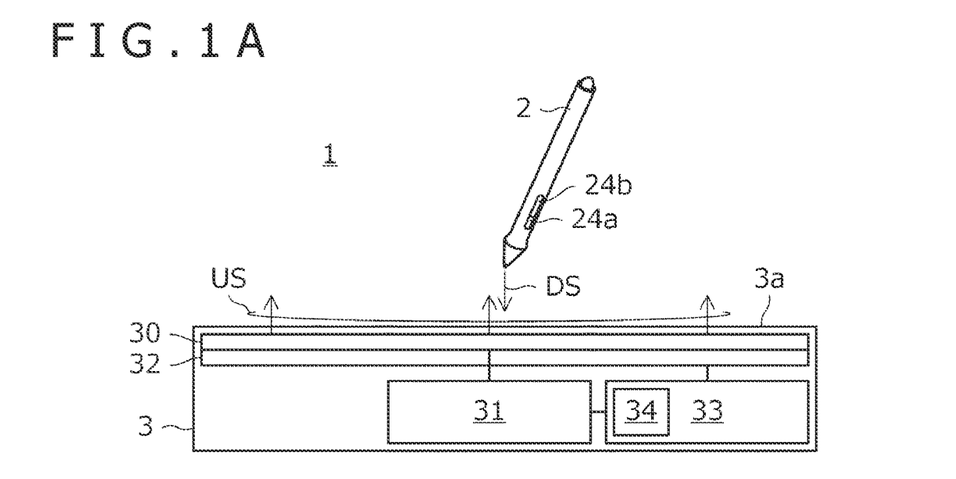
FIG. 1A is a diagram depicting a configuration of a position detecting system according to a first embodiment of the present disclosure.

FIG. 1A is a diagram depicting a configuration of a position detecting system 1 according to a first embodiment of the present disclosure. As depicted in FIG. 1A, the position detecting system 1 includes an electronic pen 2 and an electronic apparatus 3 as a position detecting device that detects the electronic pen 2.

The electronic apparatus 3 is, for example, a computer, such as a tablet computer or a digitizer, having a touch surface 3a. Provided in the electronic apparatus 3 are a sensor 30 disposed directly below the touch surface 3a, a touch controller 31 connected to the sensor 30, a display 32 disposed in such a manner as to be superposed on the sensor 30, and a host processor 33 that controls each part of the electronic apparatus 3 including these parts.

The host processor 33 is a central processing unit of the electronic apparatus 3. The host processor 33 is configured to read various kinds of programs from a memory not depicted, and execute the programs. The programs executed in this manner include various kinds of applications including an operating system of the electronic apparatus 3 and a drawing application. Of these applications, the drawing application is a program for performing processing of generating a digital ink based on a position and data supplied from the touch controller 31 and storing the digital ink in the memory in the electronic apparatus 3 and performing processing of rendering the generated digital ink, generating a video signal representing a result of the rendering, and supplying the video signal to the display 32. The display 32 is a device that displays the video signal supplied from the host processor 33. The display 32 is, for example, constituted by a liquid crystal display or an organic electroluminescent (EL) display.

In addition to the foregoing, the programs to be executed by the host processor 33 also include a device driver 34 that controls the electronic pen 2 via the touch controller 31. The device driver 34 is a program constituting a part of the operating system. The device driver 34 has roles of mediating communication between the drawing application and the touch controller 31, and receiving various kinds of user settings related to pen input by operating a setting tool depicted in FIG. 2 to be described later and performing processing according to setting contents.

The touch controller 31 is a processor that has functions of deriving the position of the electronic pen 2 on the touch surface 3a and obtaining data from the electronic pen 2 by bidirectionally communicating with the electronic pen 2 via the sensor 30, and supplying the derived position and the obtained data to the device driver 34 as needed. The processor referred to here includes a processing circuit implemented by an integrated circuit of a field programmable gate array (FPGA) or the like. The device driver 34 plays a role of transferring the supplied position and the supplied data to the drawing application. At this time, when a predetermined condition is satisfied, the device driver 34 also performs processing of changing switch information (to be described later) included in the data supplied from the touch controller 31. Details of this will be described later.

Communication between the touch controller 31 and the electronic pen 2 is, for example, implemented by an active capacitive system or an electromagnetic induction system. The sensor 30 to be used in a case where the active capacitive system is used includes a plurality of x-side linear electrodes each extending in a y-direction and arranged at equal intervals in an x-direction and a plurality of y-side linear electrodes each extending in the x-direction and arranged at equal intervals in the y-direction. On the other hand, the sensor 30 to be used in a case where the electromagnetic induction system is used includes a plurality of x-side loop coils each extending in the y-direction and a plurality of y-side loop coils each extending in the x-direction. In the following, a signal transmitted from the touch controller 31 to the electronic pen 2 will be referred to as an uplink signal US, and a signal (pen signal) transmitted from the electronic pen 2 to the touch controller 31 will be referred to as a downlink signal DS.

The touch controller 31 is configured to transmit the uplink signal US in each predetermined frame cycle, and receive the downlink signal DS at an interval of the uplink signal US. The uplink signal US has a role of notifying the electronic pen 2 of timing serving as a reference for a transmission and reception schedule for the uplink signal US and the downlink signal DS (that is, transmission timing of the downlink signal DS and reception timing of a next uplink signal US). The electronic pen 2 decides the transmission and reception schedule for the uplink signal US and the downlink signal DS based on reception timing of the uplink signal US, and transmits the downlink signal DS and receives the next uplink signal US, according to the decided transmission and reception schedule. The transmission timing and transmission duration of the downlink signal DS within the interval of the uplink signal US are defined in advance by a communication protocol.

In a case where the communication between the touch controller 31 and the electronic pen 2 is performed by the active capacitive system, the electronic apparatus 3 may be configured as what is generally called an "in-cell type" position detecting device. In this case, either the plurality of x-side linear electrodes or the plurality of y-side linear electrodes constituting the sensor 30 serve also as a common electrode for the display 32 (electrode for supplying a ground potential common to each pixel). Hence, the touch controller 31 cannot transmit the uplink signal US or receive the downlink signal DS with use of the sensor 30 in a timing in which pixels in the display 32 are driven. Accordingly, the touch controller 31 is configured to obtain the timing of driving the pixels in the display 32 from the host processor 33, transmit the uplink signal US with use of a certain period determined by driving cycles of the pixels as the above-described frame cycle, set a plurality of time slots each corresponding to a pixel driving interval as the transmission interval of the uplink signal US, and receive the downlink signal DS from the electronic pen 2 by using a time within each time slot.

Briefly describing configurations of the uplink signal US and the downlink signal DS, first, the uplink signal US is a signal modulated by a command indicating an instruction for the electronic pen 2, and includes a pulse wave (rectangular wave) formed by spreading each transmission bit by a predetermined chip sequence (spread code). On the other hand, the downlink signal DS is a signal including a position signal for making the touch controller 31 detect the position of the electronic pen 2, and a data signal modulated by data to be transmitted to the touch controller 31. The data transmitted by the data signal includes normal data periodically transmitted for drawing, the normal data being a pen pressure value (contact information), switch information, or the like to be described later, and response data transmitted as a response to the command. However, the transmission of the position signal is not essential. The touch controller 31 can detect the position of the electronic pen 2 also from the data signal.

Figure 1B:
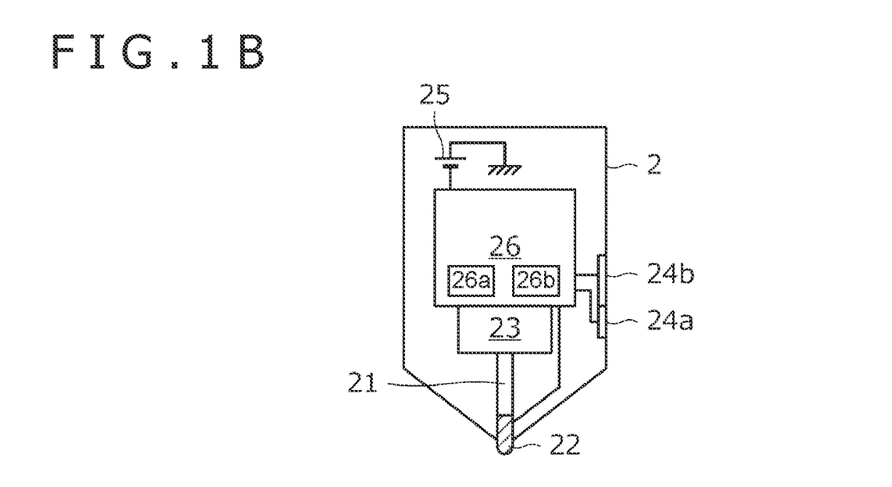
FIG. 1B is a diagram depicting an internal configuration of an electronic pen.

FIG. 1B is a diagram depicting an internal configuration of the electronic pen 2. As depicted in FIG. 1B, the electronic pen 2 includes a core body 21, a pen tip electrode 22, a pressure sensor 23, side switches 24a and 24b, a battery 25, and a processing device 26. The processing device 26 includes a processor 26a and a memory 26b storing instructions which, when executed by the processor 26a, cause the processing device 26 to perform the acts described herein. The core body 21 is a member constituting a pen shaft of the electronic pen 2. A distal end of the core body 21 constitutes a pen tip of the electronic pen 2. A tail end of the core body 21 abuts against the pressure sensor 23. The pen tip electrode 22 is a conductor provided to the pen tip. The pen tip electrode 22 is electrically connected to the processing device 26.

The pressure sensor 23 is a sensor that detects a pressure applied to the distal end of the core body 21. The pressure detected by the pressure sensor 23 is, for example, supplied as a pen pressure value of 12 bits to the processing device 26. The pen pressure value has such characteristics of becoming zero in a case where the pen tip of the electronic pen 2 is in contact with a panel such as the touch surface 3a (which case will hereinafter be referred to as "being in contact"), and, on the other hand, becoming equal to or more than zero in a case where the pen tip of the electronic pen 2 is not in contact with the panel such as the touch surface 3a (which case will hereinafter be referred to as "hovering"). Hence, the pen pressure value functions as contact information indicating whether or not the pen tip of the electronic pen 2 is in contact with the panel such as the touch surface 3a. In addition, the pressure sensor 23 functions as a contact information obtaining unit that obtains the contact information.

The side switches 24a and 24b are each a push button type switch provided to the side surface of the electronic pen 2. The side switches 24a and 24b are configured to allow on-off operation by a user. Operation states (on-off states) of the side switches 24a and 24b are supplied as switch information of 2 bits, for example, to the processing device 26.

The processing device 26 is an integrated circuit that operates on power supplied from the battery 25. The processing device 26 has a role of performing various kinds of processing including reception of the uplink signal US and generation and transmission of the downlink signal DS. Specifically, the processing device 26 receives the uplink signal US by detecting a change in the potential of the pen tip electrode 22, generates the downlink signal DS based on the received uplink signal US, and transmits the downlink signal DS by imparting a change to the potential of the pen tip electrode 22 based on the generated downlink signal DS. The processing performed by the processing device 26 based on the uplink signal US also includes processing of deciding the above-described transmission and reception schedule with the reception timing of the uplink signal US as a reference time.

The processing device 26 is configured to allow various kinds of data to be set therein from the touch controller 31 by the uplink signal US. This data includes, for example, an attribute BrushColor for determining a drawing color at a time that the drawing application renders the digital ink. In a third embodiment to be described later, setting contents of a setting tool 46b to be described later are set in the processing device 26 with use of this function.

Figure 2:
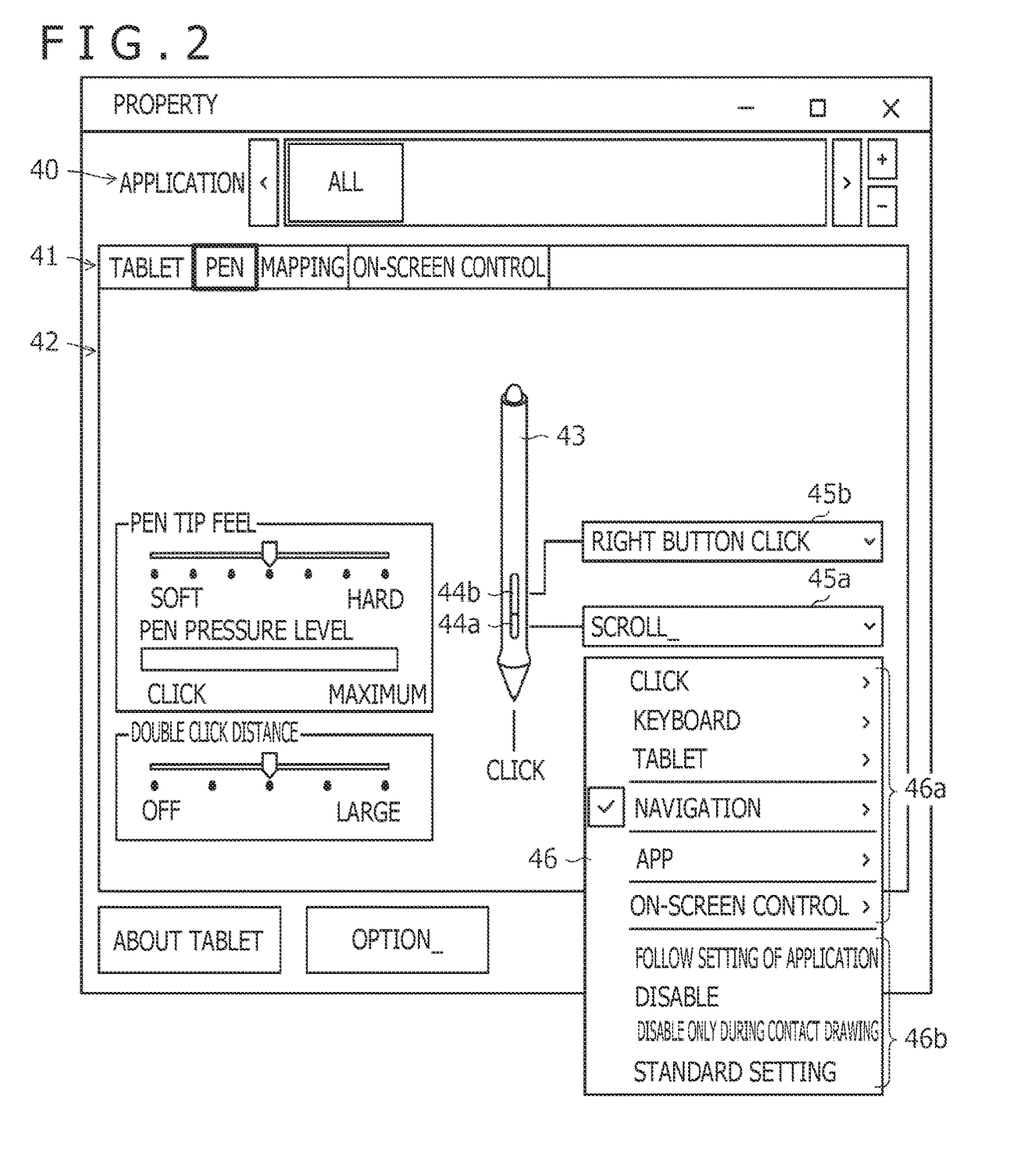
FIG. 2 is a diagram depicting a property screen of an electronic apparatus which is displayed on a display by a device driver.

FIG. 2 is a diagram depicting a property screen of the electronic apparatus 3 which is displayed on the display 32 by the device driver 34. The device driver 34 is configured to start the property screen in response to a user instruction received by the electronic apparatus 3 via an input apparatus such as the electronic pen 2.

As depicted in FIG. 2, the property screen includes an application selection box 40 and setting content selection tabs 41. The application selection box 40 is a box for selecting an application(s) by using settings according to the property screen. FIG. 2 illustrates an example in a case where all of the applications use the same settings. The setting content selection tabs 41 are tabs for selecting one of a plurality of setting screens included in the property screen. FIG. 2 depicts a state in which a setting screen 42 related to the electronic pen 2 is selected.

The setting screen 42 includes an illustration 43 of the electronic pen 2 and combo boxes 45a and 45b. The illustration 43 includes illustrations 44a and 44b of the side switches 24a and 24b. The combo boxes 45a and 45b are provided in a manner corresponding to the side switches 24a and 24b. The combo boxes 45a and 45b are configured to allow selection of functions to be started in response to depression of the corresponding side switches. The contents of functions that can be selected in the respective combo boxes 45a and 45b are the same. Thus, in the following, description will be made with attention directed to the combo box 45a.

When the user clicks or taps the combo box 45a, a list box 46 depicted in FIG. 2 is displayed. The list box 46 displays a list 46a of functions to be assigned to the side switch 24a and a setting tool 46b for setting a case where the value of switch information is disabled. A function selected in the list 46a among these functions is displayed in the combo box 45a.

The setting tool 46b has four alternatives, that is, "FOLLOW SETTING OF APPLICATION," "DISABLE," "DISABLE ONLY DURING CONTACT DRAWING," and "STANDARD SETTING." Among these alternatives, "STANDARD SETTING" is an alternative of performing processing of disabling the switch information, according to a standard setting of the device driver 34. The standard setting of the device driver 34 is either "FOLLOW SETTING OF APPLICATION" or "DISABLE" or "DISABLE ONLY DURING CONTACT DRAWING," and is written in the device driver 34 in advance.

"FOLLOW SETTING OF APPLICATION" is an alternative of leaving the processing of disabling the switch information to the application without the device driver 34 performing this processing. In a case where this alternative is selected, the device driver 34 outputs the switch information included in data supplied from the touch controller 31, to the application without performing any processing on the switch information.

"DISABLE" is an alternative of always disabling the value of the switch information in the device driver 34. In a case where this alternative is selected, the device driver 34 always disables the value of the switch information included in the data supplied from the touch controller 31. Incidentally, it suffices for concrete processing for disabling the value of the switch information to be processing that achieves the same state as a state in which the side switch 24a is not depressed as a result, and the concrete processing is not limited to any particular processing. For example, in a case where the switch information is configured such that the switch information is 1 when the side switch 24a is depressed and the switch information is 0 when the side switch 24a is not depressed, the value of the switch information may be forcibly rewritten to 0, and then may be output to the application. In addition, the switch information may not be output to the application. In addition, in a case where the device driver 34 performs processing of generating an event corresponding to a function assigned to the side switch 24a, the value of the switch information can be disabled also by not generating the event.

"DISABLE ONLY DURING CONTACT DRAWING" is an alternative of disabling the value of the switch information when the electronic pen 2 is in a state of being in contact as described above. In a case where this alternative is selected, the device driver 34 first refers to the contact information (pen pressure value) included in the data supplied from the touch controller 31, and determines whether the electronic pen 2 is in a state of being in contact or in a state of hovering. Then, the device driver 34 disables the value of the switch information only when the device driver 34 determines that the electronic pen 2 is being in contact. Concrete processing for disabling the value of the switch information is similar to that in the case of "DISABLE." When the device driver 34 determines that the electronic pen 2 is hovering, the device driver 34 outputs the switch information included in the data supplied from the touch controller 31, to the application without performing any processing on the switch information.

Figure 3:
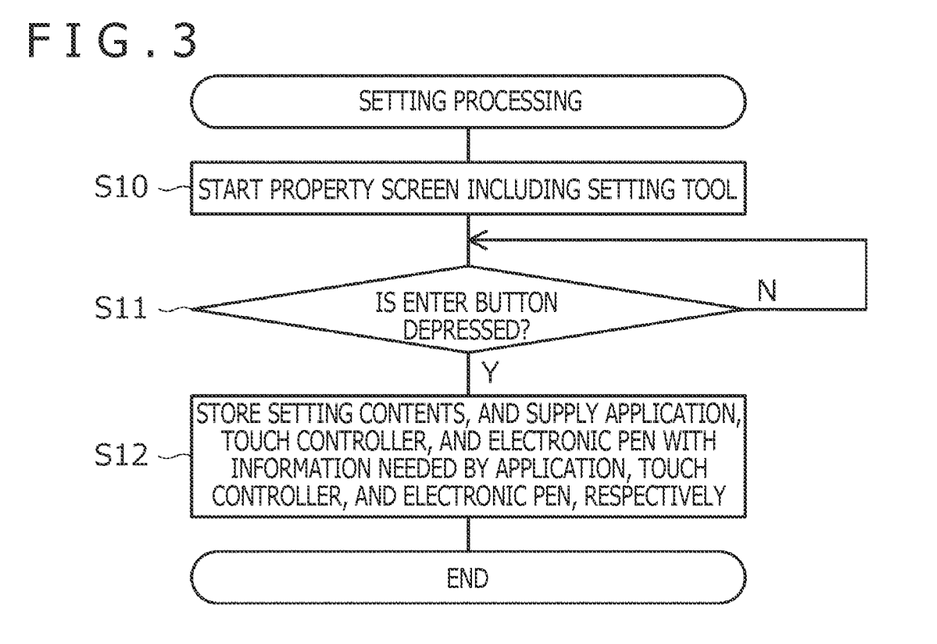
FIG. 3 is a processing flowchart depicting setting processing performed by the device driver included in the position detecting system according to the first embodiment of the present disclosure.
Figure 4:
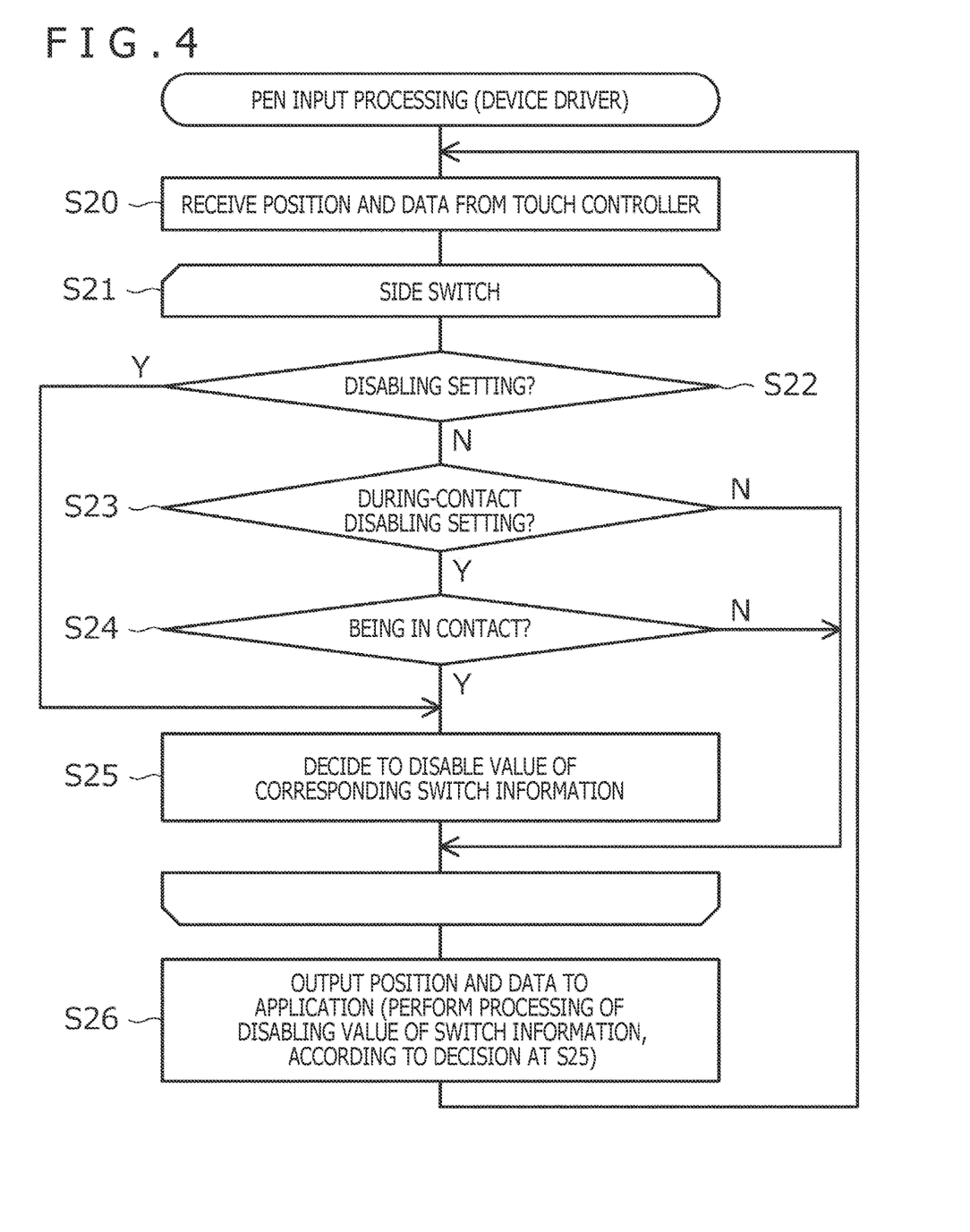
FIG. 4 is a processing flowchart depicting pen input processing performed by the device driver included in the position detecting system according to the first embodiment of the present disclosure.

FIG. 3 and FIG. 4 are processing flowcharts depicting processing performed by the device driver 34 included in the position detecting system 1 according to the present embodiment. FIG. 3 depicts processing for setting a case where the value of the switch information is disabled (which processing will hereinafter be referred to as "setting processing").

FIG. 4 depicts processing for pen input by the electronic pen 2 (which processing will hereinafter be referred to as "pen input processing").

Referring first to FIG. 3, the device driver 34 displays the property screen depicted in FIG. 2 in response to a user instruction (S10). As described above, the property screen includes the setting tool 46b for setting a case where the value of the switch information is disabled. When the user depresses an enter button on the displayed property screen (S11), the device driver 34 stores setting contents, and supplies the application, the touch controller 31, and the electronic pen 2 with information needed by the application, the touch controller 31, and the electronic pen 2, respectively (S12). The device driver 34 then ends the processing. In the present embodiment, the information supplied to the other device or processing section at S12 is not required to include the setting contents of the setting tool 46b.

Referring next to FIG. 4, the device driver 34 first receives the position of the electronic pen 2 and data transmitted by the electronic pen 2 from the touch controller 31 (S20). The thus received data includes the contact information and the switch information described above.

Next, the device driver 34 performs the processing of S22 to S25 for each of the side switches 24a and 24b of the electronic pen 2 (S21). Specifically, the device driver 34 first determines for the corresponding side switch whether or not "DISABLE" is set in the setting tool 46b (S22). A result of this determination is affirmative when "DISABLE" is set in the setting tool 46b or when "STANDARD SETTING" is set in the setting tool 46b and the standard setting of the device driver 34 is "DISABLE." Otherwise, the result is negative.

Obtaining a negative determination result at S22, the device driver 34 next determines whether or not "DISABLE ONLY DURING CONTACT DRAWING" is set in the setting tool 46b (S23). A result of this determination is affirmative when "DISABLE ONLY DURING CONTACT DRAWING" is set in the setting tool 46b or when "STANDARD SETTING" is set in the setting tool 46b and the standard setting of the device driver 34 is "DISABLE ONLY DURING CONTACT DRAWING." Otherwise, the result is negative. Obtaining an affirmative determination result at S23, the device driver 34 further refers to the contact information received at S20, and determines whether or not the electronic pen 2 is in a state of being in contact (S24).

When the device driver 34 obtains an affirmative determination result at S22, and when the device driver 34 determines at S24 that the electronic pen 2 is in a state of being in contact, the device driver 34 decides to disable the value of the corresponding switch information (S25). The device driver 34 thereafter shifts the processing to the next side switch. On the other hand, when the device driver 34 obtains a negative determination result at S23, and when the device driver 34 determines that the electronic pen 2 is not in a state of being in contact at S24, the device driver 34 shifts the processing to the next side switch without making the decision at S25.

After performing the processing of S22 to S25 for all of the side switches 24a and 24b, the device driver 34 outputs the position and the data received at S20 to the application (S26). The device driver 34 then returns the processing to S20. However, when there is switch information for which a decision is made to disable the value thereof at S25, the device driver 34 performs processing of disabling the value of the switch information at S26. The contents of concrete processing for this are as described above. That is, the device driver 34 may forcibly rewrite the value of the switch information to a disabled value, may not output the switch information, or may not generate an event corresponding to the function assigned to the side switch.

As described above, the position detecting system 1 according to the present embodiment disables, according to a user setting, the value of the switch information and therefore does not activate the functions corresponding to the side switches 24a and 24b during drawing during which the pen tip of the electronic pen 2 is in contact with the panel. It is therefore possible to prevent processing for drawing which processing is performed by the application from being interrupted against the intention of the user.

Figure 5:
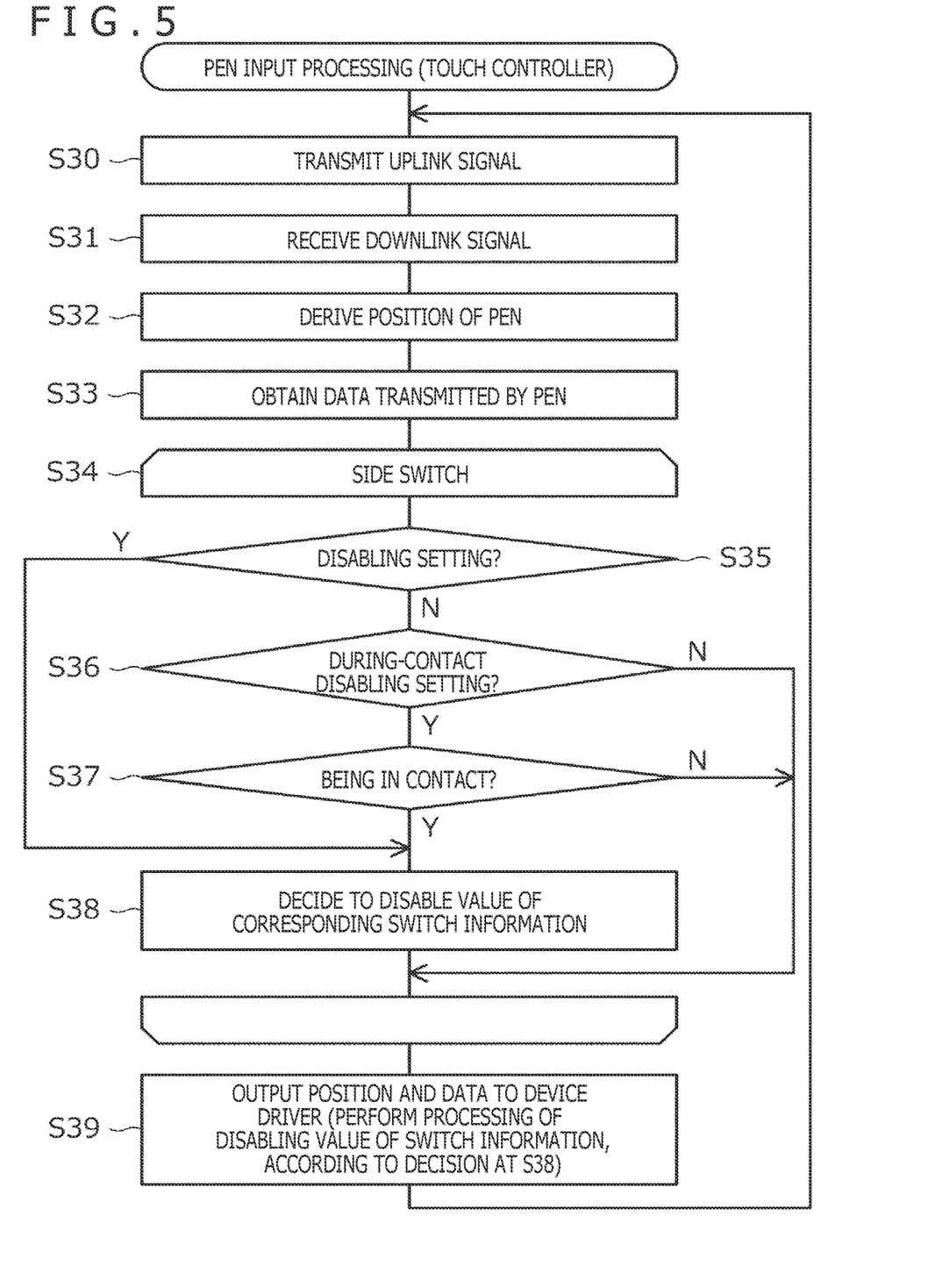
FIG. 5 is a processing flowchart depicting pen input processing performed by a touch controller included in a position detecting system according to a second embodiment of the present disclosure.

FIG. 5 is a processing flowchart depicting pen input processing performed by a touch controller 31 included in a position detecting system 1 according to a second embodiment of the present disclosure. The position detecting system 1 according to the present embodiment is different from the position detecting system 1 according to the first embodiment in that the position detecting system 1 according to the present embodiment performs the processing of disabling the value of the switch information by the touch controller 31 instead of the device driver 34. The position detecting system 1 according to the present embodiment is otherwise similar to the position detecting system 1 according to the first embodiment. In the following, attention will be directed to differences from the position detecting system 1 according to the first embodiment, and description will be made of processing performed in the position detecting system 1 according to the present embodiment.

In the present embodiment, at S12 depicted in FIG. 3, the setting contents of the setting tool 46b are supplied from the device driver 34 to the touch controller 31. The touch controller 31 stores the thus supplied setting contents, and uses the setting contents at a time of the pen input processing.

Referring to FIG. 5, the touch controller 31 first transmits an uplink signal US via the sensor 30 depicted in FIG. 1 (S30). The touch controller 31 next receives a downlink signal DS transmitted by the electronic pen 2, via the sensor 30 (S31). Next, the touch controller 31 derives the position of the electronic pen 2 on the touch surface 3a based on the reception strength of the downlink signal DS (specifically, the above-described position signal) in each linear electrode or each loop coil constituting the sensor 30 (S32), and obtains data transmitted by the pen by demodulating the downlink signal DS (S33).

After performing S33, the touch controller 31 performs the processing of S35 to S38 for each of the side switches 24a and 24b of the electronic pen 2 (S34). Concrete contents of this processing are similar to those of the processing of S22 to S25 depicted in FIG. 4. After performing the processing of S35 to S38 for all of the side switches 24a and 24b, the touch controller 31 outputs the position derived at S32 and the data obtained at S33 to the device driver 34 (S39). The touch controller 31 then returns the processing to S30. However, when there is switch information for which a decision is made to disable the value thereof at S38, the touch controller 31 performs the processing of disabling the value of the switch information at S39 by processing similar to that in the case of FIG. 4. It is thereby possible to disable, according to the setting contents of the user in the setting tool 46b, the value of the switch information.

As described above, the position detecting system 1 according to the present embodiment also disables, according to a user setting, the value of the switch information and therefore does not activate the functions corresponding to the side switches 24a and 24b during drawing during which the pen tip of the electronic pen 2 is in contact with the panel.

It is therefore possible to prevent processing for drawing which processing is performed by the application from being interrupted against the intention of the user.

Figure 6:
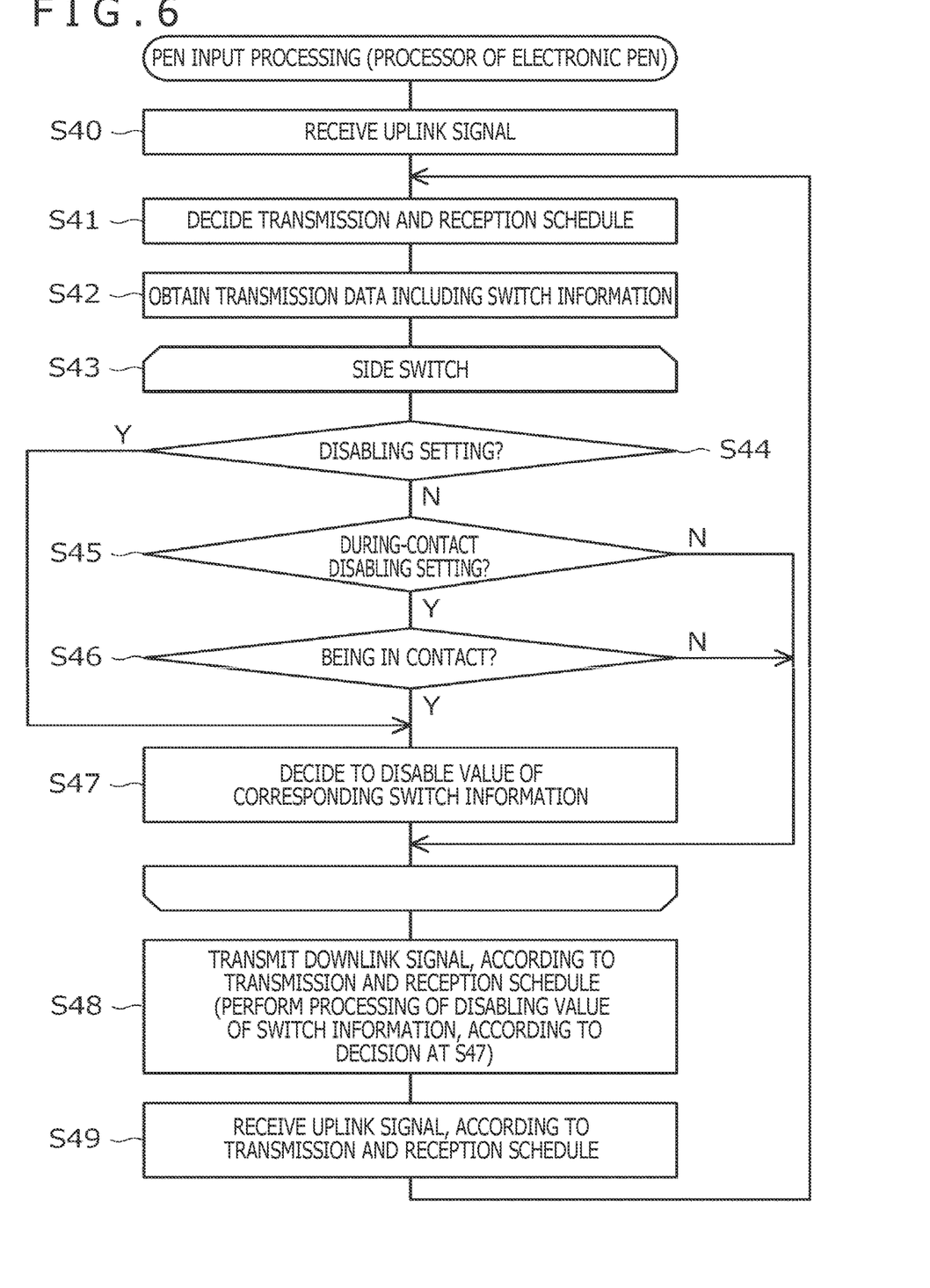
FIG. 6 is a processing flowchart depicting pen input processing performed by a processing device of an electronic pen included in a position detecting system according to a third embodiment of the present disclosure.

FIG. 6 is a processing flowchart depicting pen input processing performed by a processing device 26 of an electronic pen 2 included in a position detecting system 1 according to a third embodiment of the present disclosure. The position detecting system 1 according to the present embodiment is different from the position detecting system 1 according to the first embodiment in that the processing of disabling the value of the switch information is performed in the processing device 26 of the electronic pen 2 instead of the device driver 34. The position detecting system 1 according to the present embodiment is otherwise similar to the position detecting system 1 according to the first embodiment. In the following, attention will be directed to differences from the position detecting system 1 according to the first embodiment, and description will be made of processing performed in the position detecting system 1 according to the present embodiment.

In the present embodiment, at S12 depicted in FIG. 3, the setting contents of the setting tool 46b are supplied from the device driver 34 to the electronic pen 2 via the touch controller 31. The processing device 26 of the electronic pen 2 stores the thus supplied setting contents, and uses the setting contents at a time of the pen input processing.

Referring to FIG. 6, the processing device 26 first receives an uplink signal US via the pen tip electrode 22 depicted in FIG. 1B (S40). This reception is realized when the pen tip electrode 22 approaches the sensor 30 while the processing device 26 performs a receiving operation continuously or intermittently.

Receiving the uplink signal US, the processing device 26 decides the transmission and reception schedule for the uplink signal US and the downlink signal DS based on the reception timing of the uplink signal US (S41). Next, the processing device 26 obtains transmission data including switch information and contact information (S42), and performs the processing of S44 to S47 for each of the side switches 24a and 24b (S43). Concrete contents of this processing are similar to those of the processing of S22 to S25 depicted in FIG. 4.

After performing the processing of S44 to S47 for all of the side switches 24a and 24b, the processing device 26 transmits the downlink signal DS via the pen tip electrode 22, according to the decided transmission and reception schedule (S48). However, when there is switch information for which a decision is made to disable the value thereof at S47, the processing device 26 performs the processing of disabling the value of the switch information at S48 by processing similar to that in the cases of FIG. 4 and FIG. 5. It is thereby possible to disable, according to the setting contents of the user in the setting tool 46b, the value of the switch information.

Next, the processing device 26 receives a next uplink signal US, according to the decided transmission and reception schedule (S48). The processing device 26 then returns the processing to S41. Thereafter, the processing device 26 repeats the processing from S41.

As described above, the position detecting system 1 according to the present embodiment also disables, according to a user setting, the value of the switch information and therefore does not activate the functions corresponding to the side switches 24a and 24b during drawing during which the pen tip of the electronic pen 2 is in contact with the panel. It is therefore possible to prevent processing for drawing which processing is performed by the application from being interrupted against the intention of the user.

The preferred embodiments of the present disclosure have been described above. However, the present disclosure is not at all limited to such embodiments, and it goes without saying that the present disclosure can be carried out in various modes without departing from the spirit of the present disclosure.

For example, description has been made of an example in which the device driver 34 (host processor 33) performs the processing of disabling the value of the switch information in the first embodiment, an example in which the touch controller 31 performs the processing of disabling the value of the switch information in the second embodiment, and an example in which the processing device 26 in the electronic pen 2 performs the processing of disabling the value of the switch information in the third embodiment. However, a device or a processing section other than these may perform the processing of disabling the value of the switch information. For example, the application executed in the host processor 33 may perform the processing of disabling the value of the switch information. In this case, at S12 in FIG. 3, the setting contents of the setting tool 46b are preferably supplied from the device driver 34 to the device or the processing section that performs the processing of disabling the value of the switch information.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processing device for controlling input by an electronic pen including a side switch disposed on a side surface of the electronic pen, and a device that obtains contact information indicating whether or not a pen tip of the electronic pen is in contact with a panel, the processing device comprising:
    a processor; and
    a memory storing instructions which, when executed by the processor, cause the processing device to:
        obtain switch information indicating a depression state of the side switch;
        determine whether or not the pen tip is in contact with the panel based on the contact information;
        output the switch information when the pen tip is not determined to be in contact with the panel; and
        disable a value of the switch information when the pen tip is determined to be in contact with the panel.

2. The processing device according to claim 1, wherein the instructions, when executed by the processor, cause the processing device to:

operate a setting tool that sets a setting for disabling the value of the switch information when the pen tip is in contact with the panel, and disable the value of the switch information when the pen tip is determined to be in contact with the panel and the setting for disabling the value of the switch information when the pen tip is in contact with the panel is set in the setting tool.

3. The processing device according to claim 1, wherein the instructions, when executed by the processor, cause the processing device to:

operate a device driver and an application, wherein the device driver, in operation, determines whether or not the pen tip is in contact with the panel based on the contact information, outputs the switch information to the application when the pen tip is not determined to be in contact with the panel, and performs an operation of disabling the value of the switch information when the pen tip is determined to be in contact with the panel.

4. The processing device according to claim 1, wherein:

the electronic pen transmits a pen signal including the switch information and the contact information, and the processing device is a touch controller that receives the pen signal via a sensor, and outputs the switch information to a host processor.

5. The processing device according to claim 1, wherein:

the processing device is incorporated in the electronic pen, and outputs the switch information by transmitting a pen signal including the switch information.

6. The processing device according to claim 1, wherein the instructions, when executed by the processor, cause the processing device to:

perform processing of disabling the value of the switch information by rewriting the value of the switch information to a disabled value.

7. The processing device according to claim 1, wherein the instructions, when executed by the processor, cause the processing device to:

perform processing of disabling the value of the switch information by not outputting the switch information.

8. The processing device according to claim 1, wherein the instructions, when executed by the processor, cause the processing device to:

perform processing of disabling the value of the switch information by not generating an event corresponding to a function assigned to the side switch.

9. A method performed by a computer used in conjunction with an electronic pen, the method comprising:

operating, by the computer, a setting tool that sets a setting for disabling a value of switch information indicating a depression state of a side switch disposed on a side surface of the electronic pen when a pen tip of the electronic pen is in contact with a panel; and disabling, by the computer, the value of the switch information when the pen tip of the electronic pen is in contact with the panel and the setting for disabling the value of the switch information when the pen tip is in contact with the panel is made in the setting tool.

10. The method according to claim 9, further comprising:

receiving, by the computer, contact information indicating whether or not the pen tip of the electronic pen is in contact with the panel from the electronic pen; and determining, by the computer, whether or not the pen tip is in contact with the panel, based on the contact information.

* * * * *